Dec. 9, 1947.  M. STAUNT  2,432,179
DENTAL HAND PIECE
Filed Sept. 14, 1945  2 Sheets-Sheet 2

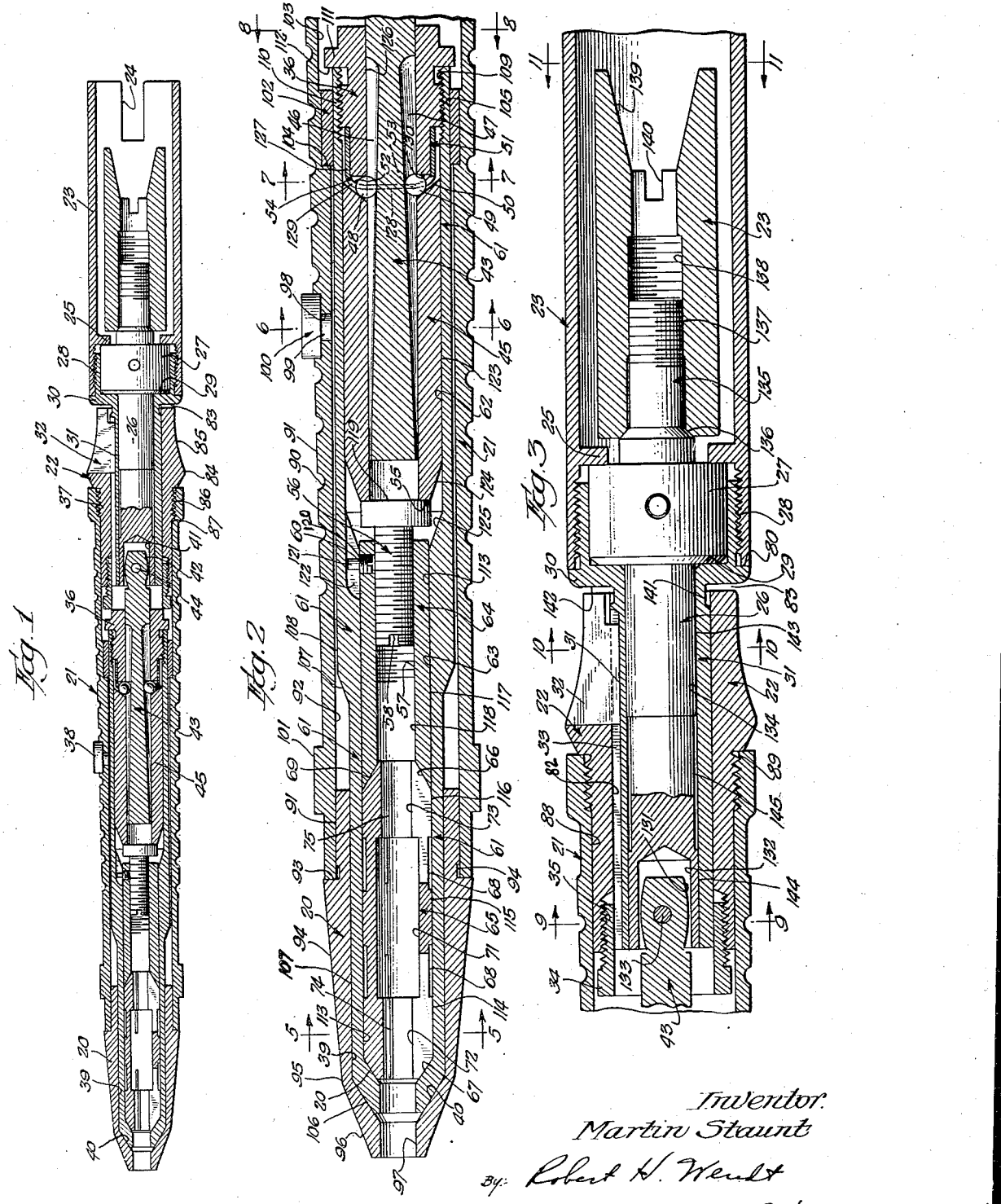

Inventor:
Martin Staunt
by Robert H. Wendt
Atty.

Patented Dec. 9, 1947

2,432,179

UNITED STATES PATENT OFFICE 2,432,179

DENTAL HAND PIECE

Martin Staunt, Chicago, Ill.

Application September 14, 1945, Serial No. 616,195

17 Claims. (Cl. 32—26)

1

The present invention relates to dental tools, such as hand pieces, and is particularly concerned with the provision of a dental hand piece of the high precision type.

One of the objects of the invention is the provision of an improved dental hand piece which is provided with a particularly fine or sensitive chuck.

Another object of the invention is the provision of an improved dental hand piece which is provided with an improved form of adjustment for determining the tightness of the grip of the chuck in order to take up wear on the chuck or the shank which it is gripping.

Another object of the invention is the provision of an improved dental hand piece structure by means of which provision is made to take up the end play, as the end of the spindle and the thrust bearing may wear.

Another object of the invention is the provision of an improved dental hand piece, the hand grip of which is provided with peripheral grooves and substantially cylindrical knurled surfaces between the grooves, which provide a better grip on the hand piece for the fingers of the operator.

Other objects and advantages of the invention will be apparent from the following description and the accompanying drawings, in which similar characters of reference indicate similar parts throughout the several views.

Referring to the two sheets of drawings accompanying this specification,

Fig. 1 is an axial sectional view taken through a hand piece embodying the invention, with certain parts, such as the rear spindle, in elevation;

Fig. 2 is a fragmentary view, similar to Fig. 1, showing the details of construction of the working end of the hand piece of Fig. 1 on the same plane, but on a larger scale;

Fig. 3 is a fragmentary view, similar to Fig. 1, on a larger scale, showing the details of construction of the rear end of the dental hand piece;

Figure 4:
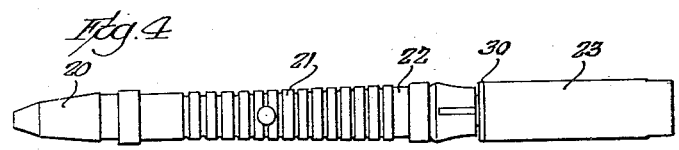
Fig. 4 is a side elevational view of a hand piece embodying the invention.
Figure 5:
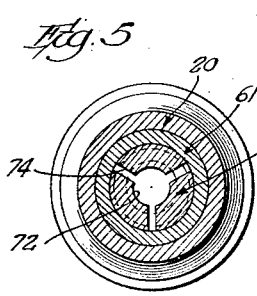
Fig. 5 is a sectional view taken on the plane of the line 5—5 of Fig. 2, looking in the direction of the arrows.
Figure 6:
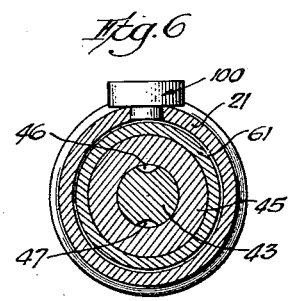
Fig. 6 is a sectional view taken on the plane of the line 6—6 of Fig. 2, looking in the direction of the arrows.
Figure 7:
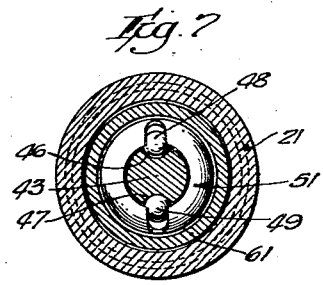
Fig. 7 is a sectional view taken on the plane of the line 7—7 of Fig. 2, looking in the direction of the arrows.
Figure 8:
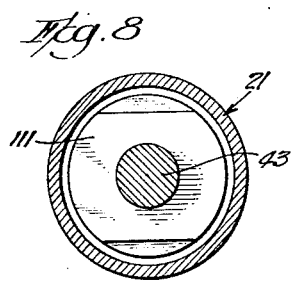
Fig. 8 is a transverse sectional view taken on the plane of the line 8—8 of Fig. 2, looking in the direction of the arrows.
Figure 9:
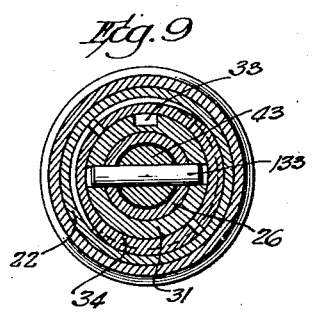
Fig. 9 is a transverse sectional view taken on the plane of the line 9—9 of Fig. 3, looking in the direction of the arrows.

Referring to Fig. 4, this is a side elevational view of the hand piece, and the parts which are visible are indicated by numerals as follows: 20 indicates the front bearing, 21 indicates a serrated sheath which serves as a handle, 22 indicated a sleeve member which serves as a slide bearing for the bearing 30, 23 indicates a slip joint connection sleeve which connects to a flexible shaft housing containing the shaft that drives the spindle of the hand piece. In some embodiments of the invention the present hand piece may be driven by means of a belt.

I shall now describe the parts which do not rotate with the shaft and tool, beginning at the right end of Figs. 1 and 3. The slip joint connection sleeve 23 comprises a tubular metal member, having a rectangular slot 24 that engages a lug on the flexible shaft housing. This sleeve 23 has an inwardly extending annular flange 25, serving as a thrust bearing for the spindle 26, which has a cylindrical enlargement 27.

The sleeve 23 has threads on its left end, and it is adapted to be threaded on the reduced threaded portion 28 of the sleeve member 30, which has a thrust surface 29 engaging the other side of the enlargement 27 on the spindle 26. The enlargement 27 preferably consists of an integral part of the spindle 26, which is provided with a transverse bore for receiving a pin to hold the spindle, while the drive sleeve 23 is being threaded on the spindle 26.

The bearing 30 has a tubular bearing sleeve 31, which extends longitudinally of the spindle, as the sleeve has a bore for rotatably supporting the spindle 26 for rotation. The threaded end of the slip joint sleeve 23 is adapted to be threaded home against an annular thrust surface 80 on the bearing 30 so that the bearing 30 and slip joint sleeve 23 are fixedly secured together in such manner as to support the spindle 26 for rotation, but to prevent axial movement of the spindle.

Figure 10:
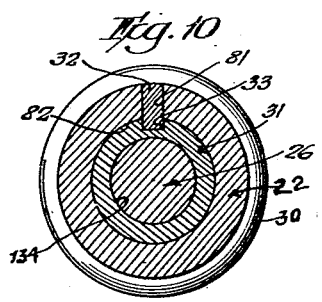
Fig. 10 is a sectional view taken on the plane of the line 10—10 of Fig. 3, looking in the direction of the arrows.
Figure 11:
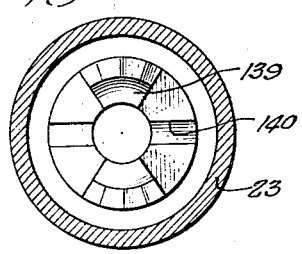
Fig. 11 is a sectional view taken on the plane of the line 11—11 of Fig. 3, looking in the direction of the arrows.

The sliding bearing sleeve 22 (Fig. 10) is provided with a slot 81 for receiving a key 32, which engages in the slot 33 of the bearing sleeve 31. Thus the sliding bearing sleeve 22 is mounted for axial sliding movement on the bearing 30, but is prevented from rotating relative to the bearing 30.

The sliding bearing sleeve 22, comprising a tubular metal member, has an internal cylindrical bore 82, which has a sliding fit on the external cylindrical surface of the bearing sleeve 31. At the right end of the slide bearing sleeve 22 there is a clearance 83, permitting axial movement of this slide bearing sleeve in the adjustment or tightening of the chuck.

The external shape of the slide bearing sleeve 22 may vary considerably, but it is preferably tapered downwardly toward the right end and formed with a ridge 84 between its ends so that the concave curved surface 85 serves as a finger grip for gripping this sleeve when the chuck is to be actuated.

Toward the left of the annular ridge 84 the external surface of the slide bearing sleeve 22 is again tapered, and is provided with the external threads 86 on the cylindrical surface 87 for engagement with the complementary threads 37 on the inside of the right end of the serrated sheath 21.

The cylindrical portion 87 of the slide bearing sleeve 22 has a rotating fit in the complementary cylindrical bore 88 in the sheath 21 so that the two engaging cylindrical surfaces 88 and 87 serve to maintain the axial alignment between the sheath 21 and the slide bearing sleeve 22, which are fixedly secured together by the threads 37, 86. The end of the sheath 21 engages an annular surface 89 on the slide bearing sleeve 22 so that these may be threaded tightly together.

The sheath 21 is preferably provided with a multiplicity of rectangularly spaced peripherally extending grooves 90, which are partially circular in cross section, having no corners in which dirt may accumulate. This facilitates the maintenance of sanitary conditions. The cylindrical land surfaces 91 between the grooves 90 are preferably knurled for convenient grip by the fingers of the operator.

The sheath 21 is of sufficient length to house the major portion of the mechanism of the hand piece. At the nose end of the instrument the sheath 21 supports the front bearing 20. For this purpose the front bearing 20 has a reduced cylindrical portion 91, which has a tight frictional fit in the bore 92 of the sheath.

The end of the sheath abuts against an annular shoulder 93, and there is preferably a relief groove at 94 adjacent this shoulder on the front bearing 20. The front bearing 20 comprises a tubular metal member, which has a cylindrical bearing bore 39, and this bore communicates with a frustoconical surface 40.

The external surface of the front bearing 20 is a tapered frustoconical surface 94, but at the point 95 the taper is increased and the frustoconical surface 96 at the end of the bearing 20 is more sharp.

The inner frustoconical surface 40 communicates with a cylindrical bore 97 in the end of the bearing for receiving the shank of a tool, such as a burr. At a point intermediate the ends of the sheath 21 this sheath is provided with a radial bore 98 (Fig. 2) for receiving the stem 99 of a headed member 100, which has a cylindrical head that is adapted to be received in the slot located in the end of an angular attachment used on such hand pieces to prevent rotation of the housing of the angular attachment.

The angular attachment has a tubular housing with a bore that engages the enlarged cylindrical portion 101 on the sheath 21, and the housing of the angular attachment also engages the frustoconical surface 94 of the bearing 20 with a complementary surface.

The sheath 21 also preferably supports a rear bearing 102 for the front spindle, and this bearing may comprise a tubular cylindrical metal member of hardened steel or suitable alloy having an external cylindrical surface which fits in the counterbore 103 of the sheath against an annular shoulder 104.

The rear bearing 102 has an inner cylindrical surface 105 which engages the exterior of the front spindle 61.

The front spindle member 61 comprises a tubular metal member of hardened steel or suitable alloy, which may be chromium plated on its external bearing surfaces, the surfaces being ground and lapped until they have a suitable fit with the bearings in which they are used.

At its front end the spindle 61 is provided with a frustoconical end surface 106, which engages the frustoconical inner surface 40 of the nose bearing 20. Extending backwardly from the frustoconical surface 106, the front spindle 61 has an external cylindrical surface 107, which has a bearing fit in the bearing bore 39 of the front bearing 20. Beyond the front bearing and toward the rear of the instrument, the size of the front spindle 61 is increased by a short, abrupt taper 107, and the external cylindrical surface 108 of the spindle is of sufficient size to have a running fit in the bore 105 of the rear bearing 102.

Between the bearings the spindle 61 has, of course, a clearance with respect to the sheath 21. At its rear end the front spindle member 61 has a threaded bore 109, which is adapted to receive the complementary threaded portion 110 on the ball thrust member 36.

The ball thrust member 36 has a radially projecting flange 111, with a thrust surface 112, against which the end of the front spindle 61 is tightly engaged when it is threaded home, so that these two members 36 and 61 rotate together.

Referring now to the inside of the front spindle member 61, this is provided with a frusto-conical surface 67 at the nose end for engagement with a complementary frusto-conical surface 70 on the collet 65.

Extending backwardly inside the front spindle 61 from the frustoconical surface 67, there is a cylindrical bore 113, which engages the external cylindrical surfaces 114, 115, 116 on the collet 65 and also engages the external cylindrical surface 117 of a chuck plunger 64.

The collet 65 comprises a tubular metal member, which may be made of suitable steel, and which has bores 72 and 73 at each end of approximately the same size as the shank of the tool that is to be gripped. Between the bores 72, 73 the collet 65 has an enlarged counterbore 71, providing a clearance.

On its external surface the collet 65 has clearance grooves 68 between the cylindrical surfaces 114, 115 and 116. At its ends it has the frustoconical surfaces 70 and 69, and the latter engages with a complementary inner frusto-conical surface 66 on the chuck plunger 64.

The clearance grooves 68 in the collet give the end portions of the collet greater flexibility, and the same is true of the enlarged counterbore 71.

Each end portion of the collet is provided with a plurality of axially extending grooves or slots 74, 75, preferably three in number, equally spaced angularly about each end of the collet. These grooves 74, 75 separate the end portions of the collet into three legs that may be forced together by the frustoconical surfaces 67 and 66 to grip the shank or stem of a tool.

The natural tendency of the end portions of the collet is to expand, due to their own resiliency, thus releasing the stem or shank.

The chuck plunger 64 comprises a tubular metal member having an external cylindrical surface which is adapted to slide in the bore 113 of the front spindle 61. At its front end it has the inner frustoconical surface 66, which engages the end of the collet and tends to contract the collet when the chuck plunger 64 moves toward the left in Fig. 2.

The chuck plunger 64 has a cylindrical bore 118, which has a threaded portion 57 for receiving the plunger screw 56. The plunger screw 56 comprises a cylindrical threaded shank provided with a substantially cylindrical head, having a plane thrust surface 119.

The shank 56 of the plunger screw has its end provided with a screw driver slot 58 so that a suitable small screw driver may be inserted in the end of the hand piece to adjust the screw 56, thus adjusting the effective length of the chuck plunger 64.

The friction involved in the turning of the screw is sufficient to retain its adjustment. The chuck plunger 64 is prevented from rotating by means of a headless screw bolt 60, which is threaded into a threaded bore 120 in the plunger 64, and has a reduced cylindrical end portion 121 extending into a slot 122, which runs longitudinally of the inner wall of the spindle 61.

In the preferred embodiment of the invention the member 121 may be an integral radially extending cylindrical lug, forming an integral part of the plunger sleeve 64. Thus, when the screw 56 is being adjusted, the plunger 64 cannot turn.

The plunger 64 is adapted to be actuated in an axial direction by a plunger actuating member 45, which comprises a tubular metal member having an external cylindrical surface 123, with a sliding fit in the counterbore 62 of the spindle 61.

At its front end the member 45 has a frustoconical surface 124, and its end portion 55 is plane so that it may engage the plane end surface 119 of the screw 56. The counterbore 62 is sufficient in length and communicates with a frustoconical portion 125, complementary to the tapered surface 124, so as to permit the actuating member 45 a sufficient range of axial movement.

At its rear or right end (Fig. 2) the actuating member 45 has an inner frustoconical surface 50, with a relatively steep slope, providing an acute angle at the rear edge of the actuating member 45. This frustoconical surface 50 is adapted to be engaged by the balls 48, 49, which are carried by a ball cage 51, which is carried by the ball thrust member 36.

The ball thrust member 36 is provided at its left end with a pair of axially extending slots, one for each ball 48 and 49, the bore 130 defining the base of each slot, which may be partially circular when viewed in elevation, so that these slots engage the balls 48, 49.

The slots 130 preferably receive more than half of the balls 48, 49 so that there is no tendency for the bals to be cammed out of the slots. The purpose of the slots 130 is to provide a direct drive between the ball thrust member 36 and the balls, instead of depending solely on the cage 51, which might at some time become loose. The left end of the ball thrust member 36 may conform in shape to the inner surface of the ball cage 51.

The ball thrust member 36 has been referred to as having a threaded surface 110, which engages the inner threads 109 on the spindle 61. This ball thrust member 36 is a tubular metal member, having an internal cylindrical bore 126. At its front end it has a reduced cylindrical portion 127, which has a tight frictional fit with the thrust ball cage 51.

The thrust ball cage 51 comprises a sheet metal tubular member of substantially cylindrical shape, having an inwardly turned curved flange, which is provided with a centrally located bore 128 for passing a cam member 43, and also having a plurality, such as, for example, two lateral slots 129 of sufficient size to receive the balls 48, 49, but also permitting these balls to project into the bore 128, while retaining the balls against axial movement of the cage.

The balls 48, 49 are thus engaged by the cage and the walls of the grooves 130 of the ball thrust member, and are held in proper position to move radially with respect to the ball thrust member. The balls, ball cage, and ball thrust member 36 are held against axial movement by being secured to the spindle by the threads 109, 110.

The cam member 43 comprises a substantially cylindrical metal member, which is provided on its diametrically opposite sides with a pair of grooves 46, 47, the grooves being partially circular in cross section and tapering in depth from the right portion of the cam member 43 in Fig. 2 to the left end of this cam.

In every case the grooves are of suitable cross section to have a rolling fit with the balls 48, 49. The cam member 43 is adapted to be moved axially in the bore 126; and when it moves axially, the balls 48, 49 are cammed inwardly or outwardly by the walls of the grooves 46, 47.

Referring now to Fig. 3, the right end of the cam member 43 is there shown as being provided with a reduced circular portion 131, which is partially spherical in shape, the lateral surface 132 being curved so that it is circular in cross section, as shown.

This permits the end of the camming member 43 to have a limited pivotal motion in the bore 132, in which it is secured by a through pin 133, which passes through bores in the cam member 43 and the rear spindle 26, the ends of the pin being riveted over, or the pin being retained in place by engagement of its ends with the walls of the bore 134 in the rear bearing 31.

The rear spindle 26 comprises a substantially cylindrical metal member, having the bore 132 at one end and having an enlargement 27, previously described, adjacent the other end, to serve as a thrust bearing, this enlargement being provided with a reduced driving shaft 135 that may be pinned in the enlargement 27 in a way similar to the pin 133 and cam 43 in the bore 133.

The reduced drive shaft 135 has a tapered or frustoconical shoulder 136 and a threaded portion 137 so that the sleeve 23, which has a threaded bore 138, may be threaded tightly on the drive shaft 135. The sleeve 23 is provided with a tapered slot 139 in its right end, leaving a pair of legs that provide a driving engagement with a flexible drive shaft, and the sleeve 23 may also be provided with the slot 140 for engagement with a screw driver, when this sleeve is being threaded on the spindle 26.

At its left end the rear bearing 31 comprises an elongated cylindrical member, which is provided with the cylindrical bore 134 and with the slot 33 for receiving the key 32, by means of which the chuck actuating member 22 is mounted for sliding movement, but prevented from rotating.

The bearing is preferably provided with a relief groove at 141 adjacent the annular thrust surface 142 or the clearance space 83. The rear spindle 26 preferably has a pair of cylindrical portions 143, 144 separated by the relief groove or portion of reduced diameter 145.

The range of movement of the chuck actuating member 22 may be regulated by the adjustment of a threaded end thrust adjuster 34 carried by the actuating member 22. For this purpose the actuating member 22 may have its left end provided with threaded bore 35, into which the threaded sleeve 34 is threaded, and the space between the end of the sleeve 34 and the annular flange 111 determines the range of movement of the actuating member 32.

The operation of my hand piece is as follows: When the sleeve 23 is connected to the housing of a flexible shaft and the flexible shaft is in engagement with the rear spindle 26 at the sleeve 23, the rear spindle will be caused to rotate within the bearing 31, carrying with it the cam member 43.

The sleeve 23, chuck actuating member 22, sheath 21, and front bearing 20 do not rotate, but are held by the hand of the operator. The cam member 43 transmits its rotative motion to the balls 48, 49, which in turn transmits rotative motion to the cage 51 and the ball thrust member 36, which is secured to the front spindle 61.

The front spindle also rotates, carrying with it the actuating sleeve 45 and the plunger 64 and collect 65, all of which latter parts are carried by the front spindle 61.

When the chuck is to be opened, the actuating member 22 is pushed toward the right in Fig. 1 with respect to the sleeve 23. This causes an effective shortening of the outer housing and causes the balls 48, 49 to be moved toward the right into the deeper part of the grooves 46, 47. As the balls move into a deeper part of the grooves they relieve pressure on the frustoconical surface 50 and permit the plunger 45 to move toward the right, which relieves the pressure on the tapered ends of the collect at the frustoconical surfaces 67, 66 so that the collet may open by virtue of its own resiliency.

When the collet is to be closed, the actuating member 22 is pulled away from the annular shoulder 142, tending to open the clearance space 83, effectively increasing the over-all length of the outer housing of the hand piece. This causes the rear spindle to withdraw the cam 43 toward the right with respect to the balls 48, 49, a more shallow part of the groove camming the balls apart in their cage.

As the balls are cammed apart they move radially and engage the frustoconical surface 50, camming the sleeve 45 toward the left, which in turn urges the plunger 64 toward the left and places an axial pressure on the collet 65.

Axial pressure on the collet at the frustoconical surfaces 66, 67 causes the end portions of the collet to be cammed toward each other, effecting a grip on a shank or stem in the collet.

When it is desired to regulate the length of the internal assembly, that is, the collet and its actuating members inside the spindle 61, a screw driver is inserted in the bore 97 into engagement with the slot 58, and the length of this assembly may be increased or decreased by turning the screw bolt 56 with respect to the sleeve 64, the sleeve being held against rotation by the screw bolt 60.

It will thus be observed that the chuck may be so adjusted that a very slight movement of its actuating members will cause it to grip the shank of the tool. Any wear that occurs can be taken up, and the chuck can be kept constantly in the best and most sensitive gripping position.

It will thus be observed that I have invented an improved dental hand piece, which is very fine and sensitive in its gripping action, and which may be used for a long period of time without any of its parts becoming loose because the wear can be taken up. The bearings which support the spindles may be lapped and ground very accurately so that they are practically in perfect axial alignment, and the present hand piece is adapted to run more smoothly and with less vibration than with any of the devices of the prior art.

The tightness of grip of the chuck can be adjusted as desired either to suit the individual needs of the user or to take up wear or end play on the end of the spindle. The sheath is provided with partially circular peripheral grooves, within which there are no corners in which dirt may be caught, yet the hand piece may be gripped without any possibility of slipping in the hand.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. In a collet closing mechanism, the combination of a spindle having a cylindrical bore for receiving the collet, said spindle having at its end an inner tapered surface, a collet slidably mounted in said bore and having a tapered end surface for engaging the inner tapered surface in the spindle, said collet having slotted and tapered end portions provided with a through bore, an actuating plunger slidably mounted in the bore of said spindle, said plunger having an inner tapered surface engaging the other tapered end surface of the collet, threaded means carried by said plunger for adjusting the effective length of the plunger, and an actuating sleeve carried in a counterbore in said spindle for engaging said threaded means to move said plunger in an axial direction, said actuating member being provided with a frustoconical camming surface on its opposite end, and anti-friction means adapted to be moved radially inward or outward to engage said latter camming surface to move the actuating member in an axial direction to open or close the collet.

2. In a collet closing mechanism, the combination of a spindle having a cylindrical bore for receiving the collet, said spindle having at its end an inner tapered surface, a collet slidably mounted in said bore and having a tapered end surface for engaging the inner tapered surface in the spindle, said collet having slotted and tapered end portions provided with a through bore, an actuating plunger slidably mounted in the bore of said spindle, said plunger having an inner tapered surface engaging the other tapered end surface of the collet, threaded means carried by said plunger for adjusting the effective length of the plunger, an actuating sleeve carried in a counterbore in said spindle for engaging said threaded means to move said plunger in an axial direction, said actuating member being provided with a frustoconical camming surface on its opposite end, and anti-friction means adapted to be moved radially inward or outward to engage said latter camming surface to move the actuating member in an axial direction to open or close the collet, said anti-friction means comprising a pair of diametrically located balls, means for retaining the balls, and an elongated camming member having axially extending grooves of tapering depth, whereby the balls are moved radially when the camming member is moved axially, said means for retaining the balls comprising a cage and a supporting sleeve, said cage having a central bore for passing the cam, and radial slots for receiving and holding the balls.

3. In a dental hand piece, the combination of a sheath comprising an elongated tubular metal member, said sheath having a bearing at its front end and being slidably mounted on the exterior of a bearing at its rear end, with a tubular housing member carried by said latter bearing and adapted to be secured to a flexible shaft, a front spindle rotatably mounted in the bearing at the front end of said sheath and also carried by a bearing intermediate the ends of said sheath, and a rear spindle rotatably mounted in the rear bearing, a collet for gripping the shank of a tool in the front end of said spindle, and common actuating means for rotating said spindle and opening or closing said collet, connecting said rear spindle and said front spindle, said common actuating means including a cam member carried by said rear spindle, said cam member having a pair of diametrically opposite tapered grooves extending longitudinally of said cam member in said front spindle, and a pair of balls located in said grooves and carried by said front spindle, said balls being movable radially by engagement in the tapered grooves of said cam member and engaging an actuating member which is moved longitudinally by the balls to open or close the collet.

4. In a dental hand piece, the combination of a sheath comprising an elongated tubular metal member, said sheath having a bearing at its front end and being slidably mounted on the exterior of a bearing at its rear end, with a tubular housing member carried by said latter bearing and adapted to be secured to a flexible shaft, a front spindle rotatably mounted in the bearing at the front end of said sheath and also carried by a bearing intermediate the ends of said sheath, and a rear spindle rotatably mounted in the rear bearing, a collet for gripping the shank of a tool in the front end of said spindle, and common actuating means for rotating said spindle and opening or closing said collet, connecting said rear spindle and said front spindle, said common actuating means including a cam member carried by said rear spindle, said cam member having a pair of diametrically opposite tapered grooves extending longitudinally of said cam member in said front spindle, and a pair of balls located in said grooves and carried by said front spindle, said balls being movably radially by engagement in the tapered grooves of said cam member and engaging an actuating member which is moved longitudinally by the balls to open or close the collet, said actuating member having an inner frusto-conical surface engaging said balls.

5. In a dental hand piece, the combination of a sheath comprising an elongated tubular metal member, said sheath having a bearing at its front end and being slidably mounted on the exterior of a bearing at its rear end, with a tubular housing member carried by said latter bearing and adapted to be secured to a flexible shaft, a front spindle rotatably mounted in the bearing at the front end of said sheath and also carried by a bearing intermediate the ends of said sheath, and a rear spindle rotatably mounted in the rear bearing, a collet for gripping the shank of a tool in the front end of said spindle, and common actuating means for rotating said spindle and opening or closing said collet, connecting said rear spindle and said front spindle, said common actuating means including a cam member carried by said rear spindle, said cam member having a pair of diametrically opposite tapered grooves extending longitudinally of said cam member in said front spindle, and a pair of balls located in said grooves and carried by said front spindle, said balls being movable radially by engagement in the tapered grooves of said cam member and engaging an actuating member which is moved longitudinally by the balls to open or close the collet, said actuating member having an inner frustoconical surface engaging said balls, said actuating member engaging a plunger and said plunger engaging said collet.

6. In a dental hand piece, the combination of a sheath comprising an elongated tubular metal member, said sheath having a bearing at its front end and being slidably mounted on the exterior of a bearing at its rear end, with a tubular housing member carried by said latter bearing and adapted to be secured to a flexible shaft, a front spindle rotatably mounted in the bearing at the front end of said sheath and also carried by a bearing intermediate the ends of said sheath, and a rear spindle rotatably mounted in the rear bearing, a collet for gripping the shank of a tool in the front end of said spindle, and common actuating means for rotating said spindle and opening or closing said collet, connecting said rear spindle and said front spindle, said common actuating means including a cam member carried by said rear spindle, said cam member having a pair of diametrically opposite tapered grooves extending longitudinally of said cam member in said front spindle, and a pair of balls located in said grooves and carried by said front spindle, said balls being movable radially by engagement in the tapered grooves of said cam member and engaging an actuating member which is moved longitudinally by the balls to open or close the collet, said actuating member having an inner frustoconical surface engaging said balls, said actuating member engaging a plunger, and said plunger engaging said collet, said plunger having a pair of complementarily threaded portions whereby the effective length of the plunger may be adjusted to adjust the gripping action of the collet and to take up wear.

7. In a dental hand piece, the combination of a sheath comprising an elongated tubular metal member, said sheath having a bearing at its front end and being slidably mounted on the exterior of a bearing at its rear end, with a tubular housing member carried by said latter bearing and adapted to be secured to a flexible shaft, a front spindle rotatably mounted in the bearing at the front end of said sheath and also carried by a bearing intermediate the ends of said sheath, and a rear spindle rotatably mounted in the rear bearing, a collet for gripping the shank of a tool in the front end of said spindle, and common actuating means for rotating said spindle and opening or closing said collet, connecting said rear spindle and said front spindle, said common actuating means including a cam member carried by said rear spindle, said cam member having a pair of diametrically opposite tapered grooves extending longitudinally of said cam member in said front spindle, and a pair of balls located in said grooves and carried by said front spindle, said balls being movable radially by engagement in the tapered grooves of said cam member and engaging an actuating member which is moved longitudinally by the balls to open or close the collet, said actuating member having an inner frustoconical surface engaging said balls, said actuating member engaging a plunger, and said plunger engaging said collet, said plunger having a pair of complementarily threaded portions whereby the effective length of the plunger may be adjusted to adjust the gripping action of the collet and to take up wear, one of said threaded members being provided with a slot accessible by a screw driver extending into said hand piece through said collet.

8. In a dental hand piece, the combination of a sheath comprising an elongated tubular metal member, said sheath having a bearing at its front end and being slidably mounted on the exterior of a bearing at its rear end, with a tubular housing member carried by said latter bearing and adapted to be secured to a flexible shaft, a front spindle rotatably mounted in the bearing at the front end of said sheath and also carried by a bearing intermediate the ends of said sheath, and a rear spindle rotatably mounted in the rear bearing, a collet for gripping the shank of a tool in the front end of said spindle, and common actuating means for rotating said spindle and opening or closing said collet, connecting said rear spindle and said front spindle, said common actuating means including a cam member carried by said rear spindle, said cam member having a pair of diametrically opposite tapered grooves extending longitudinally of said cam member in said front spindle, and a pair of balls located in said grooves and carried by said front spindle, said balls being movable radially by engagement in the tapered grooves of said cam member and engaging an actuating member which is moved longitudinally by the balls to open or close the collet said actuating member having an inner frustoconical surface engaging said balls, said actuating member engaging a plunger, and said plunger engaging said collet, said plunger having a pair of complementarily threaded portions whereby the effective length of the plunger may be adjusted to adjust the gripping action of the collet and to take up wear, one of said threaded members being provided with a slot accessible by a screw driver extending into said hand piece through said collet, and means for preventing relative rotation between said plunger and said front spindle.

9. In a dental hand piece, the combination of a sheath comprising an elongated tubular member with a front end bearing and a rear bearing fixedly secured to said sheath, a tubular spindle rotatably mounted in said bearings and including at its rear end a ball thrust member fixedly secured in said spindle, and having an axial bore, a driving member extending through said axial bore into said spindle, and having a pair of axially extending partially circular grooves tapered in depth toward the front end of said member, a pair of balls, one in each of said grooves, and adapted to be engaged by said ball thrust member, said ball thrust member having radial shoulders engaging said balls and adapted to transmit the drive from said driving member to said spindle through said balls.

10. In a dental hand piece, the combination of a sheath comprising an elongated tubular member with a front end bearing and a rear bearing fixedly secured to said sheath, a tubular spindle rotatably mounted in said bearings and including at its rear end a ball thrust member fixedly secured in said spindle, and having an axial bore, a driving member extending through said axial bore into said spindle, and having a pair of axially extending partially circular grooves tapered in depth toward the front end of said member, a pair of balls, one in each of said grooves, and adapted to be engaged by said ball thrust member, said ball thrust member having radial shoulders engaging said balls and adapted to transmit the drive from said driving member to said spindle through said balls, said balls being retained in place in said grooves and engaging said ball thrust member by a cage secured on said ball thrust member, said cage having slots for receiving the balls and surfaces for holding said balls against said ball thrust member.

11. In a dental hand piece, the combination of a sheath comprising an elongated tubular member with a front end bearing and a rear bearing fixedly secured to said sheath, a tubular spindle rotatably mounted in said bearings and including at its rear end a ball thrust member fixedly secured in said spindle, and having an axial bore, a driving member extending through said axial bore into said spindle, and having a pair of axially extending partially circular grooves tapered in depth toward the front end of said member, a pair of balls, one in each of said grooves, and adapted to be engaged by said ball thrust member, said ball thrust member having radial shoulders engaging said balls and adapted to transmit the drive from said driving member to said spindle through said balls, said driving member having its forward end surrounded by a tubular actuating member provided with a frusto-conical surface for engagement with the forward side of said balls, and said actuating member being adapted to actuate a collet chuck located in said spindle.

12. In a dental hand piece, the combination of a sheath comprising an elongated tubular member with a front end bearing and a rear bearing fixedly secured to said sheath, a tubular spindle rotatably mounted in said bearings and including at its rear end a ball thrust member fixedly secured in said spindle, and having an axial bore, a driving member extending through said axial bore into said spindle, and having a pair of axially extending partially circular grooves tapered in depth toward the front end of said member, a pair of balls, one in each of said grooves, and adapted to be engaged by said ball thrust member, said ball thrust member having radial shoulders engaging said balls and adapted to transmit the drive from said driving member to said spindle through said balls, said driving member having its forward end surrounded by a tubular actuating member provided with a frusto-conical surface for engagement with the forward side of said balls, and said actuating member being adapted to actuate a collet chuck located in said spindle, and a threaded adjustable member located between said collet chuck and said actuating member and having a screw driver slot accessible through the forward end of said handpiece, whereby the collet may be adjusted by adjusting the position of said threaded member.

13. In a dental hand piece, the combination of a sheath comprising an elongated tubular member with a front end bearing and a rear bearing fixedly secured to said sheath, a tubular spindle rotatably mounted in said bearings and including at its rear end a ball thrust member fixedly secured in said spindle, and having an axial bore, a driving member extending through said axial bore into said spindle, and having a pair of axially extending partially circular grooves tapered in depth toward the front end of said member, a pair of balls, one in each of said grooves, and adapted to be engaged by said ball thrust member, said ball thrust member having radial shoulders engaging said balls and adapted to transmit the drive from said driving member to said spindle through said balls, a drive shaft rotatably mounted in the rear end of said sheath, and a universal connection between said driving member and said drive shaft.

14. In a dental hand piece, the combination of a sheath comprising an elongated tubular member with a front end bearing and a rear bearing fixedly secured to said sheath, a tubular spindle rotatably mounted in said bearings and including at its rear end a ball thrust member fixedly secured in said spindle, and having an axial bore, a driving member extending through said axial bore into said spindle, and having a pair of axially extending partially circular grooves tapered in depth toward the front end of said member, a pair of balls, one in each of said grooves, and adapted to be engaged by said ball thrust member, said ball thrust member having radial shoulders engaging said balls and adapted to transmit the drive from said driving member to said spindle through said balls, a drive shaft rotatably mounted in the rear end of said sheath, and a universal connection between said driving member and said drive shaft, said connection comprising a cylindrical socket in said drive shaft, a partially cylindrical ball-shaped formation on said driving member in said socket, and a transverse pin carried by said formation engaging in apertures in the walls of said socket.

15. In a dental hand piece, the combination of a sheath comprising an elongated tubular member with a front end bearing and a rear bearing fixedly secured to said sheath, a tubular spindle rotatably mounted in said bearings and including at its rear end a ball thrust member fixedly secured in said spindle, and having an axial bore, a driving member extending through said axial bore into said spindle, and having a pair of axially extending partially circular grooves tapered in depth toward the front end of said member, a pair of balls, one in each of said grooves, and adapted to be engaged by said ball thrust member, said ball thrust member having radial shoulders engaging said balls and adapted to transmit the drive from said driving member to said spindle through said balls, said ball thrust member having a reduced cylindrical portion and a ball retaining cage having a pressed fit on said cylindrical portion and having slots for receiving said balls, said slots extending radially to permit the balls to move radially in said grooves.

16. In a dental hand piece, the combination of a sheath comprising an elongated tubular member with a front end bearing and a rear bearing fixedly secured to said sheath, a tubular spindle rotatably mounted in said bearings and including at its rear end a ball thrust member fixedly secured in said spindle, and having an axial bore, a driving member extending through said axial bore into said spindle, and having a pair of axially extending partially circular grooves tapered in depth toward the front end of said member, a pair of balls, one in each of said grooves, and adapted to be engaged by said ball thrust member, said ball thrust member having radial shoulders engaging said balls and adapted to transmit the drive from said driving member to said spindle through said balls, said ball thrust member having a reduced cylindrical portion and a ball retaining cage having a pressed fit on said cylindrical portion and having slots for receiving said balls, said slots extending radially to permit the balls to move radially in said grooves, and a collet actuating member having an inner frusto-conical surface engaging the balls on a side opposite to said ball thrust member, whereby a radial movement of the balls causes an axial movement of the collet actuating member.

17. In a dental hand piece, the combination of a sheath comprising an elongated tubular member with a front end bearing and a rear bearing fixedly secured to said sheath, a tubular spindle rotatably mounted in said bearings and including at its rear end a ball thrust member fixedly secured in said spindle, and having an axial bore, a driving member extending through said axial bore into said spindle, and having a pair of axially extending partially circular grooves tapered in depth toward the front end of said member, a pair of balls, one in each of said grooves, and adapted to be engaged by said ball thrust member, said ball thrust member having radial shoulders engaging said balls and adapted to transmit the drive from said driving member to said spindle through said balls, said ball thrust member having a reduced cylindrical portion and a ball retaining cage having a pressed fit on said cylindrical portion and having slots for receiving said balls, said slots extending radially to permit the balls to move radially in said grooves, and a collet actuating member having an inner frusto-conical surface engaging the balls on a side opposite to said ball thrust member, whereby a radial movement of the balls causes an axial movement of the collet actuating member, said collet actuating member having a bore for slidably receiving said driving member.

MARTIN STAUNT.

REFERENCES CITED

The following references are of record in the file of this patent:

UNITED STATES PATENTS

| Number | Name | Date |
|---|---|---|
| 1,380,716 | Herman | June 7, 1921 |
| 1,741,734 | Pannwitz | Dec. 31, 1929 |
| Re. 15,681 | Porter | Aug. 21, 1923 |
| 1,427,286 | Graves | Aug. 29, 1922 |
| 552,669 | Pedersen | Jan. 7, 1896 |